(12) United States Patent
Zafar et al.

(10) Patent No.: US 11,756,048 B2
(45) Date of Patent: Sep. 12, 2023

(54) SYSTEM FOR CENTRALIZED RESOURCE TRANSFORMATION ENGINE WITHIN A TECHNICAL ENVIRONMENT

(71) Applicant: BANK OF AMERICA CORPORATION, Charlotte, NC (US)

(72) Inventors: Mansoor Zafar, Frisco, TX (US); Jitendra Bhimavarapu, Naperville, IL (US); Saurabh Khanna, Frisco, TX (US); Matthias von Rueden, Northbrook, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 616 days.

(21) Appl. No.: 16/922,152

(22) Filed: Jul. 7, 2020

(65) Prior Publication Data
US 2022/0012753 A1    Jan. 13, 2022

(51) Int. Cl.
*G06Q 10/10* (2023.01)
*G06Q 10/0631* (2023.01)
(Continued)

(52) U.S. Cl.
CPC ..... *G06Q 30/0185* (2013.01); *G06Q 10/0631* (2013.01); *G06Q 10/103* (2013.01); *G06Q 10/105* (2013.01); *H04L 63/08* (2013.01)

(58) Field of Classification Search
CPC ......... G06Q 10/0631; G06Q 10/06311; G06Q 10/103; G06Q 10/105
See application file for complete search history.

(56) References Cited

U.S. PATENT DOCUMENTS 7,333,223 B2    2/2008   Gupton et al.
8,386,115 B2    2/2013   McCutchen et al.
(Continued)

OTHER PUBLICATIONS

Yu, C. M. (2007). A dynamic, distributive and heterogeneous authorization policy management framework (Order No. 3295074). Available from ProQuest Dissertations and Theses Professional. (304719184). (Year: 2007).*

(Continued)

*Primary Examiner* — Maria C Santos-Diaz
(74) *Attorney, Agent, or Firm* — Moore & Van Allen PLLC; Nicholas C. Russell

(57) ABSTRACT

Systems, computer program products, and methods are described herein for centralized resource transformation engine within a technical environment. The present invention is configured to receive, via a resource generation interface, one or more resource generation protocols associated with a generation of a resource; automatically initiate a push notification comprising the one or more resource generation protocols to one or more resource management devices; receive, from a computing device associated with a user, a resource generation request; electronically receive, from the one or more resource management devices, one or more data objects, wherein the one or more data objects are generated using the one or more resource generation protocols; initiate a resource composition engine, wherein the resource composition engine is configured to generate the resource using at least the one or more data objects; and transmit control signals configured to cause the computing device of the user to display the resource.

18 Claims, 3 Drawing Sheets

(51) Int. Cl.
*G06Q 30/018* (2023.01)
*H04L 9/40* (2022.01)
*G06Q 10/105* (2023.01)

(56) References Cited

U.S. PATENT DOCUMENTS

| | | | | |
|---|---|---|---|---|
| 2008/0189162 | A1* | 8/2008 | Ganong | G06F 16/958 |
| | | | | 701/300 |
| 2014/0236881 | A1* | 8/2014 | Meda | G06F 9/5077 |
| | | | | 706/47 |
| 2014/0237442 | A1* | 8/2014 | Meda | G06Q 10/0633 |
| | | | | 717/102 |
| 2017/0366394 | A1* | 12/2017 | Kurian | H04L 67/12 |
| 2021/0266328 | A1* | 8/2021 | Sharma | H04L 63/108 |
| 2021/0311788 | A1* | 10/2021 | Castinado | G06F 9/547 |
| 2021/0365551 | A1* | 11/2021 | Selegean | G06F 21/554 |

OTHER PUBLICATIONS

Khanna, G., Varadharajan, P., & Bagchi, S. (2006). Automated online monitoring of distributed applications through external monitors (Year: 2006).*

* cited by examiner

SYSTEM FOR CENTRALIZED RESOURCE TRANSFORMATION ENGINE WITHIN A TECHNICAL ENVIRONMENT

FIELD OF THE INVENTION

The present invention embraces a system for centralized resource transformation engine within a technical environment

BACKGROUND

Business correspondence is the exchange of information in a written format for the process of business activities. Business correspondence can take place between entities, within entities or between the customers and the organization. The correspondence typically refers to the written communication between persons. Existing frameworks that enable customer correspondence tend to scale poorly in cost and efficiency.

There is a need for a system for centralized resource transformation engine within a technical environment.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for centralized resource transformation engine within a technical environment is presented. The system comprising: at least one non-transitory storage device; and at least one processing device coupled to the at least one non-transitory storage device, wherein the at least one processing device is configured to: electronically receive, via a resource generation interface, one or more resource generation protocols associated with a generation of a resource; automatically initiate a push notification comprising the one or more resource generation protocols to one or more resource management devices based on at least receiving the one or more resource generation protocols; electronically receive, from a computing device associated with a user, a resource generation request; electronically receive, from the one or more resource management devices, one or more data objects, wherein the one or more data objects are generated using the one or more resource generation protocols; initiate a resource composition engine, wherein the resource composition engine is configured to generate the resource using at least the one or more data objects; and transmit control signals configured to cause the computing device of the user to display the resource.

In some embodiments, the at least one processing device is further configured to: electronically receive, from a computing device associated with a resource administration group, a resource generation request, wherein the resource generation request further comprises at least generating the resource in a first format; electronically receive, from the computing device associated with the resource administration group, the one or more resource generation protocols associated with the resource generation request; compare the one or more resource generation protocols with one or more supervisory requirements; determine that the one or more resource generation protocols meets the one or more supervisory requirements; and initiate an execution of the resource generation request based on at least determining that the one or more resource generation protocols meets the one or more supervisory requirements.

In some embodiments, the at least one processing device is further configured to: electronically receive, via the resource generation interface, the one or more resource generation protocols associated with a generation of a resource; and record the one or more resource generation protocols in a centralized taxonomy repository.

In some embodiments, the at least one processing device is further configured to: electronically receive, from the computing device associated with the user, a request from the user to access the resource; initiate an authentication request to the user in response to receiving the request to access the resource; electronically receive, via the computing device of the user, one or more authentication credentials in response to the authentication request; validate the user based on at least verifying the one or more authentication credentials; and authorize the user to access the resource.

In some embodiments, the at least one processing device is further configured to: electronically receive an indication from the resource composition engine, that the resource has been generated using at least the one or more data objects; and store the resource in one or more resource repositories.

In some embodiments, the at least one processing device is further configured to: initiate the resource composition engine, wherein the resource composition engine is configured to generate the resource using at least the one or more data objects; determine a resource type associated with the resource; and initiate one or more resource composition sub-engines associated with the resource composition engine configured to generate the resource using at least the one or more data objects based on at least the resource type.

In some embodiments, the at least one processing device is further configured to initiate a resource indexing engine, wherein initiating further comprises: generating indexing information associated with the resource based on at least the resource type; and tagging the resource with the indexing information.

In some embodiments, the at least one processing device is further configured to: electronically receive, via the resource indexing engine, an indication that the resource has been tagged; and initiate a resource notification engine, wherein the resource notification engine is configured to trigger an alert notification, wherein the alert notification comprises an indication that the resource is ready for user access; and transmit, using the resource notification engine, control signals configured to cause the computing device of the user to display the alert notification.

In another aspect, a computer program product for centralized resource transformation engine within a technical environment is presented. The computer program product comprising a non-transitory computer-readable medium comprising code causing a first apparatus to: electronically receive, via a resource generation interface, one or more resource generation protocols associated with a generation of a resource; automatically initiate a push notification comprising the one or more resource generation protocols to one or more resource management devices based on at least receiving the one or more resource generation protocols; electronically receive, from a computing device associated with a user, a resource generation request; electronically receive, from the one or more resource management devices, one or more data objects, wherein the one or more data objects are generated using the one or more resource generation protocols; initiate a resource composition engine, wherein the resource composition engine is configured to generate the resource using at least the one or more data objects; and transmit control signals configured to cause the computing device of the user to display the resource.

In yet another aspect, a method centralized resource transformation engine within a technical environment is presented. The method comprising: electronically receiving, via a resource generation interface, one or more resource generation protocols associated with a generation of a resource; automatically initiating a push notification comprising the one or more resource generation protocols to one or more resource management devices based on at least receiving the one or more resource generation protocols; electronically receiving, from a computing device associated with a user, a resource generation request; electronically receiving, from the one or more resource management devices, one or more data objects, wherein the one or more data objects are generated using the one or more resource generation protocols; initiating a resource composition engine, wherein the resource composition engine is configured to generate the resource using at least the one or more data objects; and transmitting control signals configured to cause the computing device of the user to display the resource.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
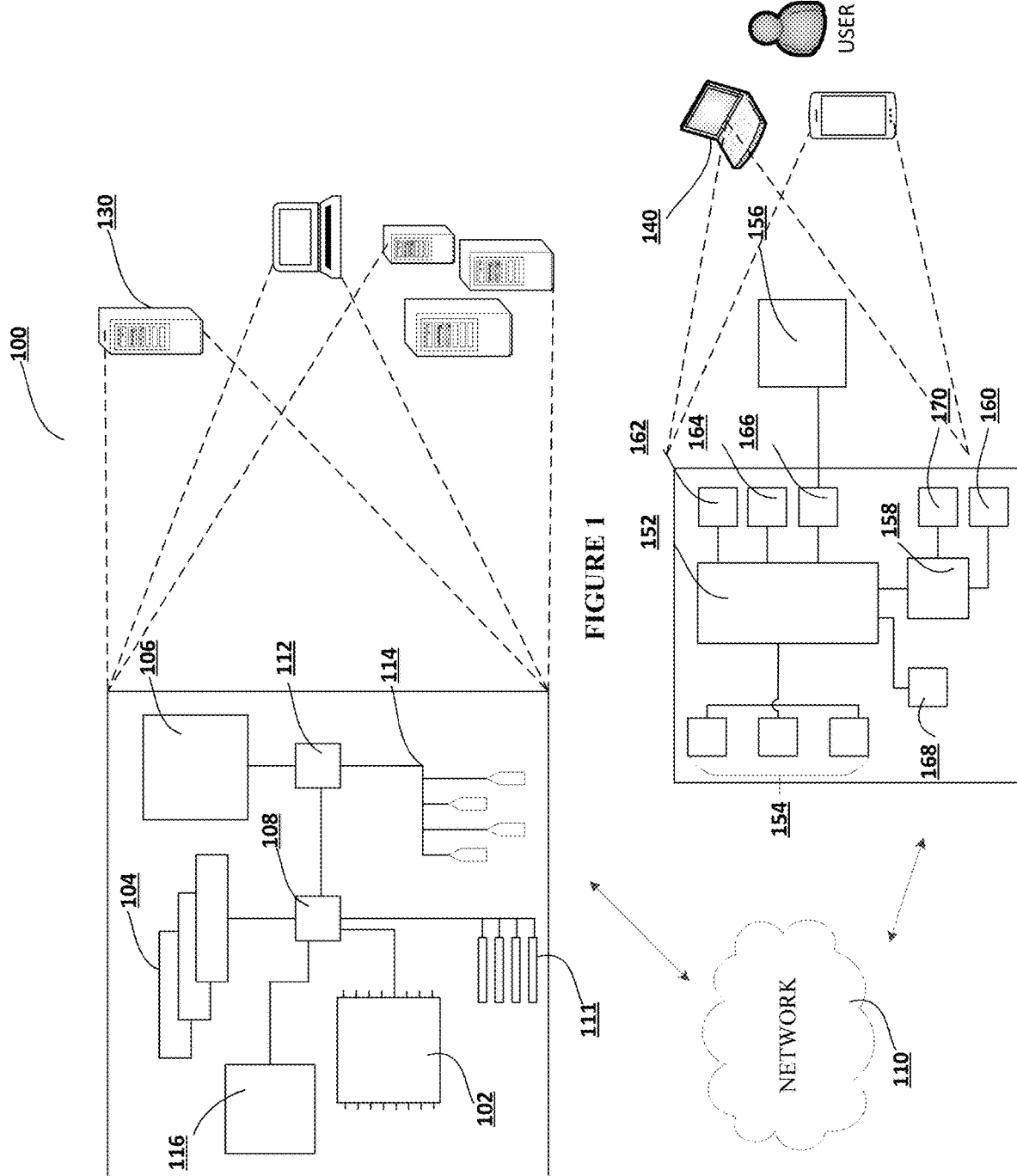
Figure 2:
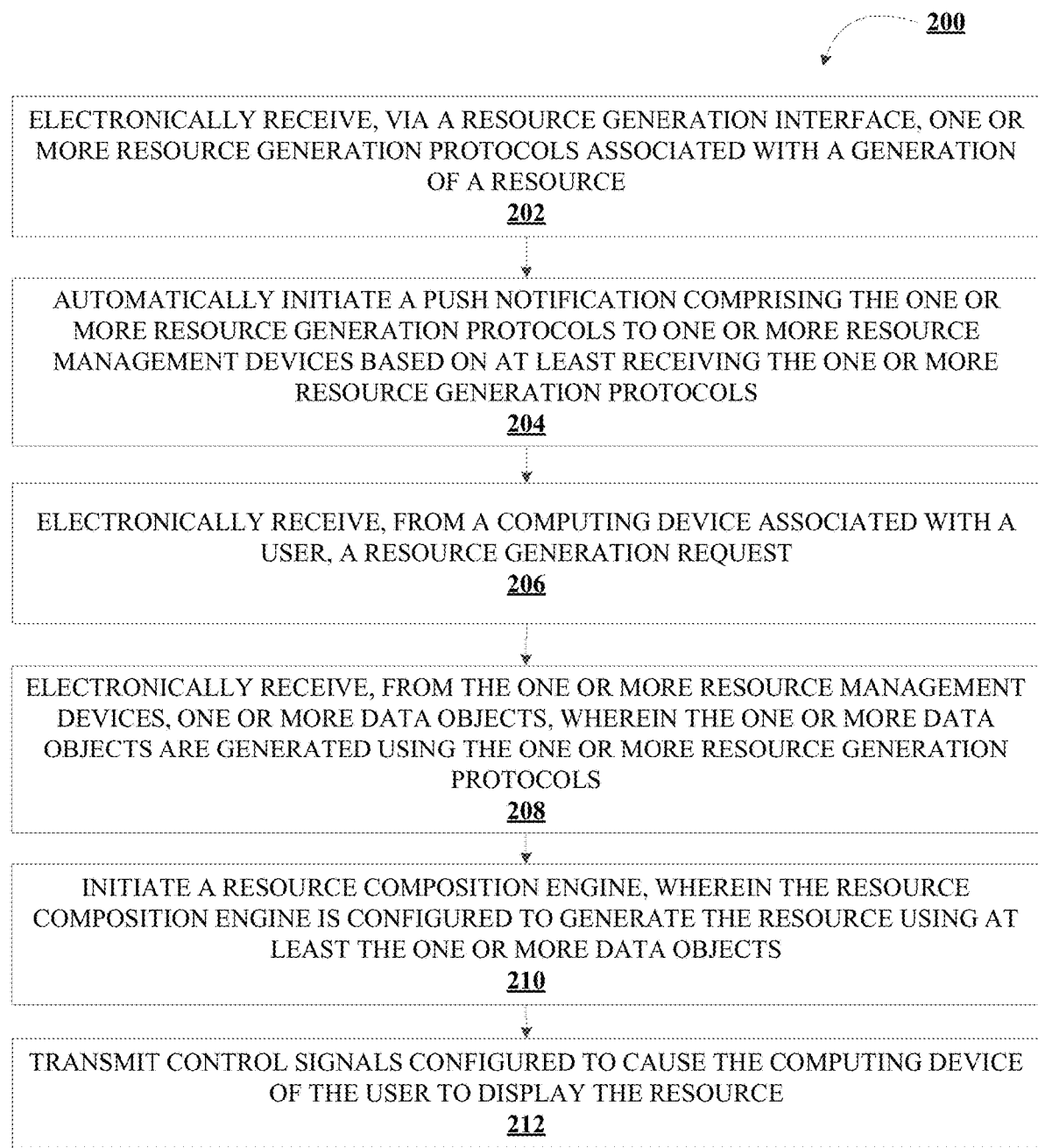
Figure 3:
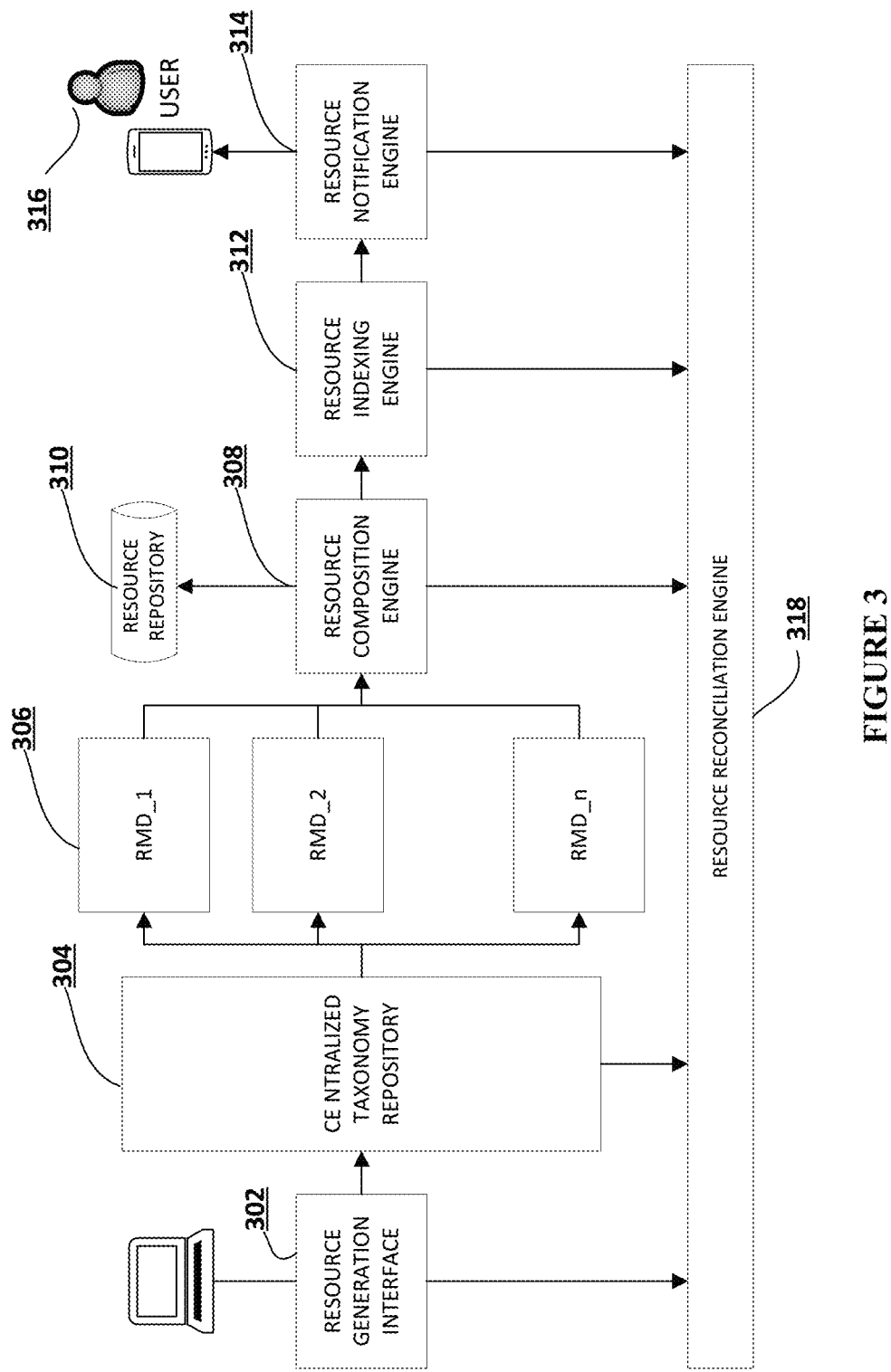

Having thus described embodiments of the invention in general terms, reference will now be made the accompanying drawings, wherein:

FIG. 1 illustrates technical components of a system for centralized resource transformation engine within a technical environment, in accordance with an embodiment of the invention;

FIG. 2 illustrates a process flow for centralized resource transformation engine within a technical environment, in accordance with an embodiment of the invention; and FIG. 3 illustrates a flow chart for centralized resource transformation engine within a technical environment, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" or "interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "resource" may generally refer to objects, products, devices, goods, documents, commodities, services, and the like, and/or the ability and opportunity to access and use the same. Some example implementations herein contemplate documents associated with products and/or services provided to the user by the entity, including documents that is stored and/or maintained by the entity. In some example implementations, a resource may be associated with one or more accounts or may be property that is not associated with a specific account.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for centralized resource transformation engine within a technical environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for centralized resource transformation engine within a technical environment, in accordance with an embodiment of the invention. As shown in block 202, the process flow includes electronically receiving, via a resource generation interface, one or more resource generation protocols associated with a generation of a resource. In some embodiments, the resource may be scheduled to be generated periodically as part of a product and/or service provided by the entity. In some other embodiments, the resource may be a one-time object generated by the entity. In some embodiments, the system may be configured to electronically receive, from a computing device associated with a resource administration group, a resource generation request. In some embodiments, the resource administration group may be a line-of-business (LOB) associated with the entity. In one aspect, LOBs may refer to a group, team, or department tasked with the management of a specific set of tasks to manage a product and/or service offered by the entity. In one aspect, the resource generation request further comprises at least generating the resource in a first format. In some embodiments, generating the resource may include converting an existing resource from its original format to the first format. In other embodiments, generating the resource may include generating the resource which is otherwise typically generated in an original format, in the first format instead. In examples where the resource is a document that is typically generated and made available to the user in a paper format, generating the document may include converting the document from a paper format to a digital format capable of being presented to the user via the computing device. On the other hand, the document that is typically generated in paper format will be generated directly in a digital format capable of being presented to the user via the computing device. Examples of such documents may be any document generated as part of any products and/or services provided by the entity such as a credit card statement, a tax statements, renewal notices, account agreement notices, change in terms, and/or the like.

In addition, the system may be configured to electronically receive, from the computing device associated with the resource administration group, the one or more resource generation protocols associated with the resource generation request. In one aspect, the one or more resource generation protocols may be a set of rules or procedure governing the generation of the resource. Each resource is typically generated based on a specific set of resource generation protocols. In response to receiving the one or more resource generation protocols, the system may be configured to compare the one or more resource generation protocols with one or more supervisory requirements. In one aspect, the one or more supervisory requirements may be any regulations, standards, framework, and/or internet guidelines associated with the entity. In some embodiments, the regulations may include internal regulations developed by the entity. In other embodiments, the regulations may include external regulations required by an external regulatory and/or governance body.

In response to comparing the one or more resource generation protocols with the one or more supervisory requirements, the system may be configured to determine that the one or more resource generation protocols meets the one or more supervisory requirements. Based on at least determining that the one or more resource generation protocols meets the one or more supervisory requirements, the system may be configured to initiate an execution of the resource generation request. In some embodiments, the system may be configured to determine that the one or more resource generation protocols does not meet the one or more supervisory requirements. For example, if the resource is a document that required by the one or more supervisory requirements to be made accessible to the user in a paper format but the user has requested the document to be in a digital format. In such situations, the system may be configured to generate one or more actions to be executed by the resource administration group to ensure that the one or more resource generation protocols meet the one or more supervisory requirements. Following the previous example, the one or more actions may include identifying specific portions of the document that is required to be in paper format, while converting the rest into digital format. In another example, the one or more actions may include requiring the user to confirm the contents of the document via one or more pre-authorized communication channels before generating the document in a digital format.

In some embodiments, in some embodiments, the system may be configured to receive an indication that the one or more actions have been executed by the resource administration group. In response, the system may be configure to automatically initiate the execution of the resource generation request. In some other embodiments, the system may be configured to receive an indication that the one or more actions have been executed by the resource generation group. In response, the system may be configured to compare the one or more resource generation protocols and the one or more actions executed by the resource generation group with the one or more supervisory requirements. If the one or more resource generation protocols and the one or more actions executed by the resource generation group meet the one or more supervisory requirements, the system may be configured to initiate the execution of the resource generation request.

Next, as shown in block 204, the process flow includes automatically initiating a push notification comprising the one or more resource generation protocols to one or more resource management devices based on at least receiving the one or more resource generation protocols. In some embodiments, the one or more resource generation protocols are submitted to all downstream resource management devices. In one aspect, the resource management devices may include one or more hardware components and/or one or more software components (e.g., application) configured to generate one or more data objects used to generate the resource. In some embodiments, the system may be configured to record the one or more resource generation protocols in a centralized taxonomy repository. In one aspect, the one or more resource management devices may be configured to have access to the centralized taxonomy repository. By recording the one or more resource generation protocols in the centralized taxonomy repository, the system may be configured to push the one or more resource generation protocols to each resource management device linked to the centralized taxonomy repository. In doing so, each data object generated by the resource management devices downstream will be generated in conformation with the one or more resource generation protocols.

Next, as shown in block 206, the process flow includes electronically receiving, from a computing device associated with a user, a resource generation request. In some embodiments, the user may request the generation of the resource by initiating the resource generation request. In one aspect, the user may be able to request the generation of the resource via a mobile application stored on the computing device associated with the user. In some embodiments, the resource generation request may include an option to request that the resource be in the first format. In examples where the resource is a document, the first format may be a digital format capable of being accessed by the user using the computing device.

Next, as shown in block 208, the process flow includes electronically receiving, from the one or more resource management devices, one or more data objects, wherein the one or more data objects are generated using the one or more resource generation protocols. As described herein, the one or more resource management devices are configured to generate one or more data objects that are used in the generation and/or composition of the resource. By pushing the one or more resource generation protocols to each of the one or more resource management devices via the centralized taxonomy repository, the system may be configured to enable the one or more resource management devices to generate the one or more data objects using the one or more resource generation protocols. Instead of having to transform each data object after it has been generated by the resource management devices, the system may be configured to enable the generation of the one or more data objects already subject to the one or more resource generation protocols.

Next as shown in block 210, the process flow includes initiating a resource composition engine, wherein the resource composition engine is configured to generate the resource using at least the one or more data objects. In this regard, the system may be configured to determine a resource type associated with the resource. In response, the system may be configured to initiate one or more resource composition sub-engines associated with the resource composition engine configured to generate the resource using at least the one or more data objects based on at least the resource type. In some embodiments, the resource composition sub-engines may be configured to compose a standardized structure for the resource when generating the resource. For example, in cases where the resource is a credit card to be mailed to the user, the standardized structure may layout and language of the document accompanying the credit card when it is mailed to the user. In some embodiments, the system may be configured to electronically receive an indication from the resource composition engine, that the resource has been generated using at least the one or more data objects. In response, the system may be configured to store the resource in one or more resource repositories. In some embodiments, in response to receiving an indication that the resource has been generated, the system may be configured to initiate a resource indexing engine. In one aspect, the resource indexing engine may be configured to generate indexing information associated with the resource based on at least the resource type. In response to generating the indexing information, the resource indexing engine may be configured to tag the resource with the indexing information.

Next, as shown in block 212, the process flow includes transmitting control signals configured to cause the computing device of the user to display the resource. In some embodiments, the system may be configured to electronically receive, via the indexing engine, an indication that the resource has been tagged. In response, the system may be configured to initiate a resource notification engine that is configured to trigger an alert notification to the user. In one aspect, the alert notification may include an indication that the resource is ready for user access. In response, the system may be configured to transmit, using the resource notification engine, control signals configured to cause the computing device of the user to display the alert notification. In some embodiments, the alert notification may include one or more options using which the user may access the resource. The user may utilize any of the one or more options to access the resource. In doing so, the system may be configured to electronically receive, from the computing device associated with the user, a request from the user to access the resource. In response, the system may be configured to initiate an authentication request to the user in response to receiving the request to access the resource. In response to initiating the authentication request, the system may be configured to electronically receive, via the computing device of the user, one or more authentication credentials in response to the authentication request. In response to receiving the authentication credentials, the system may be configured to verify the authentication credentials provided by the user. By successfully verifying the authentication credentials, the system may be configured to validate the user. Based on at least validating the user, the system may be configured to authorize the user to access the resource. In one aspect, the system may be configured to authorize the computing device of the user to allow the user to access the resource.

FIG. 3 illustrates a flow chart for centralized resource transformation engine within a technical environment, in accordance with an embodiment of the invention. At step 302, the resource generation protocols are received via a resource generation interface. At step 304, these resource generation protocols are stored in a centralized taxonomy repository, linked to several resource management devices (RMD). At step 306, these RMDs, generate data object based on the resource generation protocols. At step 308, the resource composition engine receives the data objects and generates and/or composes the resource using the data objects generated by the RMDs. At step 310, the generated resource is stored in a resource repository. At step 312, once the resource is generated, it is indexed and tagged using the resource indexing engine. At step 314, once the resource is indexed and tagged, the resource notification engine initiates an alert notification to the computing device 316 of the user. At step 318, after the execution of each action at steps 302-316, the execution is recorded by the resource reconciliation engine. By recording each step every time an action is executed, the system may be configured to generate an accurate audit trail. In case of any issue, the reconciliation records can provide an accurate snapshot capable of identifying the source of the issue.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for centralized resource transformation engine within a technical environment, the system comprising:

at least one non-transitory storage device; and at least one processing device coupled to the at least one non-transitory storage device, wherein the at least one processing device is configured to:

electronically receive, via a resource generation interface, one or more resource generation protocols associated with a generation of a resource;

automatically initiate a push notification comprising the one or more resource generation protocols to one or more resource management devices based on at least receiving the one or more resource generation protocols;

electronically receive, from a computing device associated with a user, a resource generation request, wherein the resource generation request further comprises at least generating the resource in a first format;

electronically receive, from the one or more resource management devices, one or more data objects, wherein the one or more data objects are generated using the one or more resource generation protocols, wherein enabling generation of the one or more data objects previously subject to the one or more resource generation protocols based on the push notification to the one or more resource management devices, wherein preventing transforming a data object after generation by the one or more resource management devices;

initiate a resource composition engine, wherein the resource composition engine is configured to generate the resource using at least the one or more data objects;

initiate a resource indexing engine, wherein the resource indexing engine is configured to generate indexing information associated with the resource based on a resource format type and tag the resource with the indexing information; and transmit control signals configured to cause the computing device of the user to display the resource.

2. The system of claim 1, wherein the at least one processing device is further configured to:

electronically receive, via the resource generation interface, the one or more resource generation protocols associated with a generation of a resource; and record the one or more resource generation protocols in a centralized taxonomy repository.

3. The system of claim 1, wherein the at least one processing device is further configured to:
electronically receive, via the resource generation interface, the one or more resource generation protocols associated with a generation of a resource; and
record the one or more resource generation protocols in a centralized taxonomy repository.

4. The system of claim 1, wherein the at least one processing device is further configured to:
electronically receive, from the computing device associated with the user, a request from the user to access the resource;
initiate an authentication request to the user in response to receiving the request to access the resource;
electronically receive, via the computing device of the user, one or more authentication credentials in response to the authentication request;
validate the user based on at least verifying the one or more authentication credentials; and
authorize the user to access the resource.

5. The system of claim 1, wherein the at least one processing device is further configured to:
electronically receive an indication from the resource composition engine, that the resource has been generated using at least the one or more data objects; and
store the resource in one or more resource repositories.

6. The system of claim 1, wherein the at least one processing device is further configured to:
initiate the resource composition engine, wherein the resource composition engine is configured to generate the resource using at least the one or more data objects;
determine a resource type associated with the resource; and
initiate one or more resource composition sub-engines associated with the resource composition engine configured to generate the resource using at least the one or more data objects based on at least the resource type.

7. The system of claim 1, wherein the at least one processing device is further configured to:
electronically receive, via the resource indexing engine, an indication that the resource has been tagged; and
initiate a resource notification engine, wherein the resource notification engine is configured to trigger an alert notification, wherein the alert notification comprises an indication that the resource is ready for user access; and
transmit, using the resource notification engine, control signals configured to cause the computing device of the user to display the alert notification.

8. A computer program product for centralized resource transformation engine within a technical environment, the computer program product comprising a non-transitory computer-readable medium comprising code causing a first apparatus to:
electronically receive, via a resource generation interface, one or more resource generation protocols associated with a generation of a resource;
automatically initiate a push notification comprising the one or more resource generation protocols to one or more resource management devices based on at least receiving the one or more resource generation protocols;
electronically receive, from a computing device associated with a user, a resource generation request, wherein the resource generation request further comprises at least generating the resource in a first format;
electronically receive, from the one or more resource management devices, one or more data objects, wherein the one or more data objects are generated using the one or more resource generation protocols, wherein enabling generation of the one or more data objects previously subject to the one or more resource generation protocols based on the push notification to the one or more resource management devices, wherein preventing transforming a data object after generation by the one or more resource management devices;
initiate a resource composition engine, wherein the resource composition engine is configured to generate the resource using at least the one or more data objects;
initiate a resource indexing engine, wherein the resource indexing engine is configured to generate indexing information associated with the resource based on a resource format type and tag the resource with the indexing information; and
transmit control signals configured to cause the computing device of the user to display the resource.

9. The computer program product of claim 8, wherein the first apparatus is further configured to:
electronically receive, from a computing device associated with a resource administration group, a resource generation request, wherein the resource generation request further comprises at least generating the resource in a first format;
electronically receive, from the computing device associated with the resource administration group, the one or more resource generation protocols associated with the resource generation request;
compare the one or more resource generation protocols with one or more supervisory requirements;
determine that the one or more resource generation protocols meets the one or more supervisory requirements; and
initiate an execution of the resource generation request based on at least determining that the one or more resource generation protocols meets the one or more supervisory requirements.

10. The computer program product of claim 8, wherein the first apparatus is further configured to:
electronically receive, via the resource generation interface, the one or more resource generation protocols associated with a generation of a resource; and
record the one or more resource generation protocols in a centralized taxonomy repository.

11. The computer program product of claim 8, wherein the first apparatus is further configured to:
electronically receive, from the computing device associated with the user, a request from the user to access the resource;
initiate an authentication request to the user in response to receiving the request to access the resource;
electronically receive, via the computing device of the user, one or more authentication credentials in response to the authentication request;
validate the user based on at least verifying the one or more authentication credentials; and
authorize the user to access the resource.

12. The computer program product of claim 8, wherein the first apparatus is further configured to:
  electronically receive an indication from the resource composition engine, that the resource has been generated using at least the one or more data objects; and
  store the resource in one or more resource repositories.

13. The computer program product of claim 8, wherein the first apparatus is further configured to:
  initiate the resource composition engine, wherein the resource composition engine is configured to generate the resource using at least the one or more data objects;
  determine a resource type associated with the resource; and
  initiate one or more resource composition sub-engines associated with the resource composition engine configured to generate the resource using at least the one or more data objects based on at least the resource type.

14. The computer program product of claim 8, wherein the first apparatus is further configured to:
  electronically receive, via the resource indexing engine, an indication that the resource has been tagged; and
  initiate a resource notification engine, wherein the resource notification engine is configured to trigger an alert notification, wherein the alert notification comprises an indication that the resource is ready for user access; and
  transmit, using the resource notification engine, control signals configured to cause the computing device of the user to display the alert notification.

15. A method centralized resource transformation engine within a technical environment, the method comprising:
  electronically receiving, via a resource generation interface, one or more resource generation protocols associated with a generation of a resource;
  automatically initiating a push notification comprising the one or more resource generation protocols to one or more resource management devices based on at least receiving the one or more resource generation protocols;
  electronically receiving, from a computing device associated with a user, a resource generation request, wherein the resource generation request further comprises at least generating the resource in a first format;
  electronically receiving, from the one or more resource management devices, one or more data objects, wherein the one or more data objects are generated using the one or more resource generation protocols, wherein enabling generation of the one or more data objects previously subject to the one or more resource generation protocols based on the push notification to the one or more resource management devices, wherein preventing transforming a data object after generation by the one or more resource management devices;
  initiating a resource composition engine, wherein the resource composition engine is configured to generate the resource using at least the one or more data objects;
  initiating a resource indexing engine, wherein the resource indexing engine is configured to generate indexing information associated with the resource based on a resource format type and tag the resource with the indexing information; and
  transmitting control signals configured to cause the computing device of the user to display the resource.

16. The method of claim 15, wherein the method further comprises:
  electronically receiving, from a computing device associated with a resource administration group, a resource generation request, wherein the resource generation request further comprises at least generating the resource in a first format;
  electronically receiving, from the computing device associated with the resource administration group, the one or more resource generation protocols associated with the resource generation request;
  comparing the one or more resource generation protocols with one or more supervisory requirements;
  determining that the one or more resource generation protocols meets the one or more supervisory requirements; and
  initiating an execution of the resource generation request based on at least determining that the one or more resource generation protocols meets the one or more supervisory requirements.

17. The method of claim 15, wherein the method further comprises:
  electronically receiving, via the resource generation interface, the one or more resource generation protocols associated with a generation of a resource; and
  recording the one or more resource generation protocols in a centralized taxonomy repository.

18. The method of claim 15, wherein the method further comprises:
  electronically receiving, from the computing device associated with the user, a request from the user to access the resource;
  initiating an authentication request to the user in response to receiving the request to access the resource;
  electronically receiving, via the computing device of the user, one or more authentication credentials in response to the authentication request;
  validating the user based on at least verifying the one or more authentication credentials; and
  authorizing the user to access the resource.

* * * * *